(12) United States Patent
McCann

(10) Patent No.: US 7,936,866 B2
(45) Date of Patent: *May 3, 2011

(54) METHODS, SYSTEMS, AND COMPUTER PROGRAM PRODUCTS FOR PROCESSING MOBILE ORIGINATED QUERY MESSAGES FOR PREPAID MOBILE SUBSCRIBERS IN A NUMBER PORTABILITY ENVIRONMENT

(75) Inventor: Thomas Matthew McCann, Raleigh, NC (US)

(73) Assignee: Tekelec, Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/807,691

(22) Filed: May 30, 2007

(65) Prior Publication Data

US 2007/0230680 A1 Oct. 4, 2007

Related U.S. Application Data

(63) Continuation of application No. 11/070,940, filed on Mar. 3, 2005, now Pat. No. 7,254,391.

(60) Provisional application No. 60/550,071, filed on Mar. 4, 2004.

(51) Int. Cl.
*H04M 7/00* (2006.01)

(52) U.S. Cl. ......... 379/221.14; 379/221.01; 379/221.09; 379/221.1; 379/221.12; 379/221.13; 455/428; 455/445

(58) Field of Classification Search .............. 455/426.1, 455/426.2, 428, 432.1, 433, 435.1, 445
See application file for complete search history.

(56) References Cited

U.S. PATENT DOCUMENTS 6,185,414 B1 * 2/2001 Brunner et al. ............... 455/406
(Continued)

FOREIGN PATENT DOCUMENTS

WO   WO 2005/089119 A2   9/2005

OTHER PUBLICATIONS

Notification of Transmittal of the International Search Report and the Written Opinion of the International Searching Authority, or the Declaration for International Application No. PCT/US05/06926 (Oct. 11, 2006).

(Continued)

*Primary Examiner* — Dai A Phuong
(74) *Attorney, Agent, or Firm* — Jenkins, Wilson, Taylor & Hunt, P.A.

(57) ABSTRACT

Methods, systems, and computer program products for routing query messages associated with prepaid subscribers in a number portability environment are disclosed. One method may include sending a registration message to an HLR. At the HLR, the ID or address of an STP is inserted as the prepaid SCP ID in a registration response message. The registration response message is sent to the MSC/VLR that originated the registration message. This action forces the VLR to send prepaid query messages to the STP, rather than to the prepaid SCP. When the STP receives a query message relating to call originating from the prepaid subscriber, the STP performs a number portability database lookup and determines the routing number corresponding to the called subscriber and the prepaid SCP corresponding to the calling subscriber. The STP then routes the query message to the appropriate prepaid SCP. The prepaid SCP determines whether the call is an in-network call using the routing number obtained in the number portability database lookup and the calling party number.

7 Claims, 5 Drawing Sheets

U.S. PATENT DOCUMENTS

| | | |
|---|---|---|
| 6,208,872 B1 | 3/2001 | Schmidt |
| 6,373,930 B1 * | 4/2002 | McConnell et al. ..... 379/114.28 |
| 6,694,153 B1 | 2/2004 | Campbell et al. |
| 6,975,852 B1 | 12/2005 | Sofer et al. |
| 7,254,391 B2 | 8/2007 | McCann |
| 7,346,022 B1 * | 3/2008 | Roy ............................. 370/328 |
| 2002/0071530 A1 * | 6/2002 | Hannigan .................. 379/88.19 |
| 2003/0190913 A1 | 10/2003 | Coad et al. |
| 2004/0166878 A1 | 8/2004 | Erskine et al. |
| 2004/0203641 A1 * | 10/2004 | Hazlewood ................ 455/414.1 |
| 2006/0020680 A1 | 1/2006 | Emberty et al. |
| 2006/0050680 A1 | 3/2006 | Naim et al. |
| 2006/0240819 A1 | 10/2006 | Xu et al. |
| 2007/0042779 A1 * | 2/2007 | Eikkula ......................... 455/445 |
| 2007/0263565 A1 * | 11/2007 | Roy ............................. 370/328 |

OTHER PUBLICATIONS

"Prepaid vs. Number Portability," Power Point presentation, (publication date unknown; electronic file created Jul. 29, 2003).

Notice of Allowance and Fee(s) Due for U.S. Appl. No. 11/070,940 (May 11, 2007).

Official Action for U.S. Appl. No. 11/070,940 (Mar. 9, 2007).

Official Action for U.S. Appl. No. 11/070,940 (Jun. 20, 2006).

* cited by examiner

US 7,936,866 B2

METHODS, SYSTEMS, AND COMPUTER PROGRAM PRODUCTS FOR PROCESSING MOBILE ORIGINATED QUERY MESSAGES FOR PREPAID MOBILE SUBSCRIBERS IN A NUMBER PORTABILITY ENVIRONMENT

RELATED APPLICATIONS

This application is a continuation of U.S. patent application Ser. No. 11/070,940, filed Mar. 3, 2005 now U.S. Pat. No. 7,254,391, which claims the benefit of U.S. Provisional Patent Application Ser. No. 60/550,071, filed Mar. 4, 2004; the disclosure of each of which is incorporated herein by reference in its entirety.

TECHNICAL FIELD

The subject matter described herein relates to methods, systems, and computer program products for processing messages associated with prepaid mobile subscribers. More particularly, the subject matter described herein relates to methods, systems, and computer program products for processing messages associated with prepaid mobile subscribers in a number portability environment.

BACKGROUND ART

In mobile communications networks, some subscribers are prepaid subscribers. Prepaid subscribers are required to pay in advance for call time. Accordingly, for a prepaid subscriber, it is necessary to verify whether the subscriber has sufficient credit in his or her prepaid account to complete calls originated by the prepaid subscriber. In order to determine whether the subscriber has sufficient credit, it is necessary to determine the billing rate to be applied to the call. Since some mobile service providers offer special billing rates for calls between subscribers within their networks, and the rate may vary depending on whether the called party is a subscriber of the same network as the calling party.

In order to determine the billing rate to be charged for a prepaid call, prepaid subscriber databases are used. When a prepaid subscriber roams and attempts to make a call, the visitor location register (VLR) sends a global system for mobile communications (GSM) update location message (or corresponding IS-41 message) to the subscriber's home location register (HLR). The HLR receives the update location message, determines that the subscriber is a prepaid subscriber, and formulates a GSM insert subscriber data message (or corresponding IS-41 message). In the insert subscriber data message, the HLR inserts the address of the prepaid database that contains information for the calling mobile subscriber. The HLR forwards the information to the VLR.

Subsequently, when the roaming subscriber initiates a call, the VLR queries the identified prepaid subscriber database to determine rate information for the call. Prepaid subscriber databases identify rates to be charged for calls based on ranges of called party numbers. For example, one range of called party numbers may correspond to one service provider, and another range of called party numbers may correspond to another service provider. If the called party number is within a range that corresponds to the same service provider as the calling party, a reduced billing rate may be applied to the call.

In a number portability (NP) environment, the called party number for a call originating from a prepaid subscriber may be ported and therefore may falsely be identified as within or outside of the range of subscriber numbers corresponding to the calling party service provider. For example, the prepaid subscriber database may incorrectly identify the call as in-network call and charge a billing rate that is too low for the call. In another example, the prepaid subscriber database may incorrectly identify the call as an out-of-network call and charge a rate that is too high.

One potential solution to the prepaid subscriber/number portability problem is to intercept queries to prepaid subscriber databases and insert the routing number (RN) corresponding to the ported called subscriber in the prepaid subscriber query message. However, this solution requires that the receiving node be capable of intercepting queries that are not addressed to it. In addition, this solution requires that the HLR keep track of prepaid subscriber databases corresponding to each calling party number.

Accordingly, in light of the difficulties associated with processing messages associated with prepaid mobile subscribers, there exists a need for improved methods, systems, and computer program products for processing signaling messages associated with prepaid subscribers in a number portability environment in which differential billing is performed.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
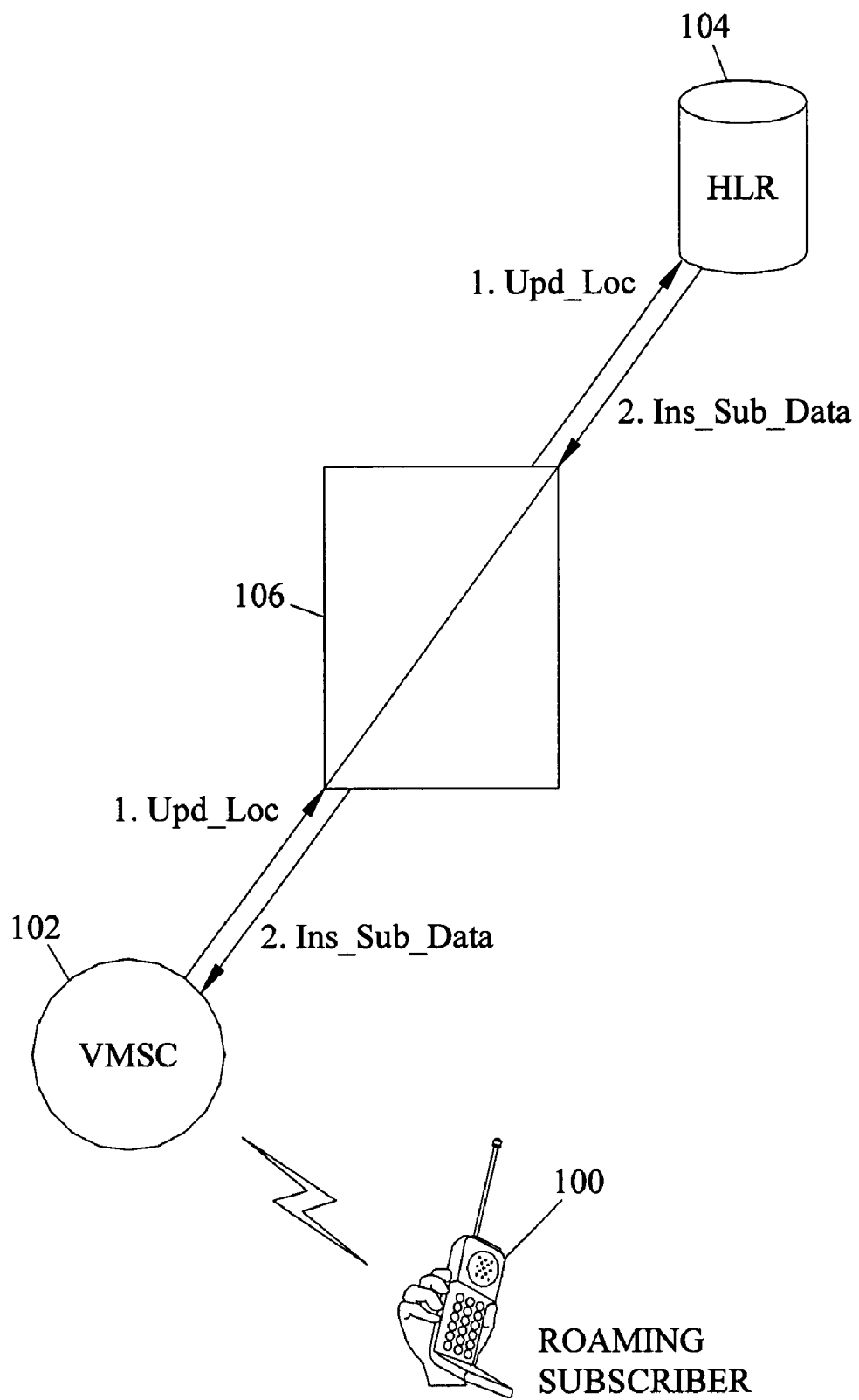
FIG. 1 is a network diagram illustrating an exemplary message flow for inserting a signal transfer point (STP) address in a registration response message for a prepaid platform ID according to an embodiment of the subject matter described herein.

FIG. 1 illustrates an exemplary registration process that occurs when a prepaid subscriber roams into an area served by a visited mobile switching center (VMSC). Referring to FIG. 1, when a subscriber 100 roams into a network served by VMSC 102, VMSC 102 sends an update location message to the subscriber's HLR 104. HLR 104 has mobile originating triggers, which identify that the subscriber is a prepaid subscriber. HLR 104 formulates an insert subscriber data message and sends the insert subscriber data message back to the VMSC 100. Rather than inserting the address of the subscriber's prepaid platform in the insert subscriber data message, HLR 104 inserts the address of STP 106. This step eliminates the need for HLR 104 to store mappings between calling party addresses and prepaid subscriber database addresses. In addition, this step forces VMSC 102 to send prepaid query messages to STP 106 when the subscriber originates a call, rather than requiring that STP 106 intercept such messages.

In FIG. 1, HLR 104 is a GSM HLR, and the messages shown are GSM messages relating to registering a mobile subscriber. However, the subject matter described herein is not limited to operation in a GSM network. In an alternate embodiment, HLR 104 may be an IS-41 HLR, and the network may be an IS-41 network. In such a network, the update location message would be replaced by an IS-41 registration notification (REGNOT) message. The insert subscriber data message would be replaced by a registration notification response message. Other than the message formats, the processing is the same as that described with regard to FIG. 1. As used herein, the term "registration message" refers to a message sent from the VMSC to the HLR to register a subscriber, such as a REGNOT message or an update location message. The term "registration response message" refers to a message that is sent from the HLR to the VMSC in response to the registration message, such as a REGNOT response message or an insert subscriber data message.

Figure 2:
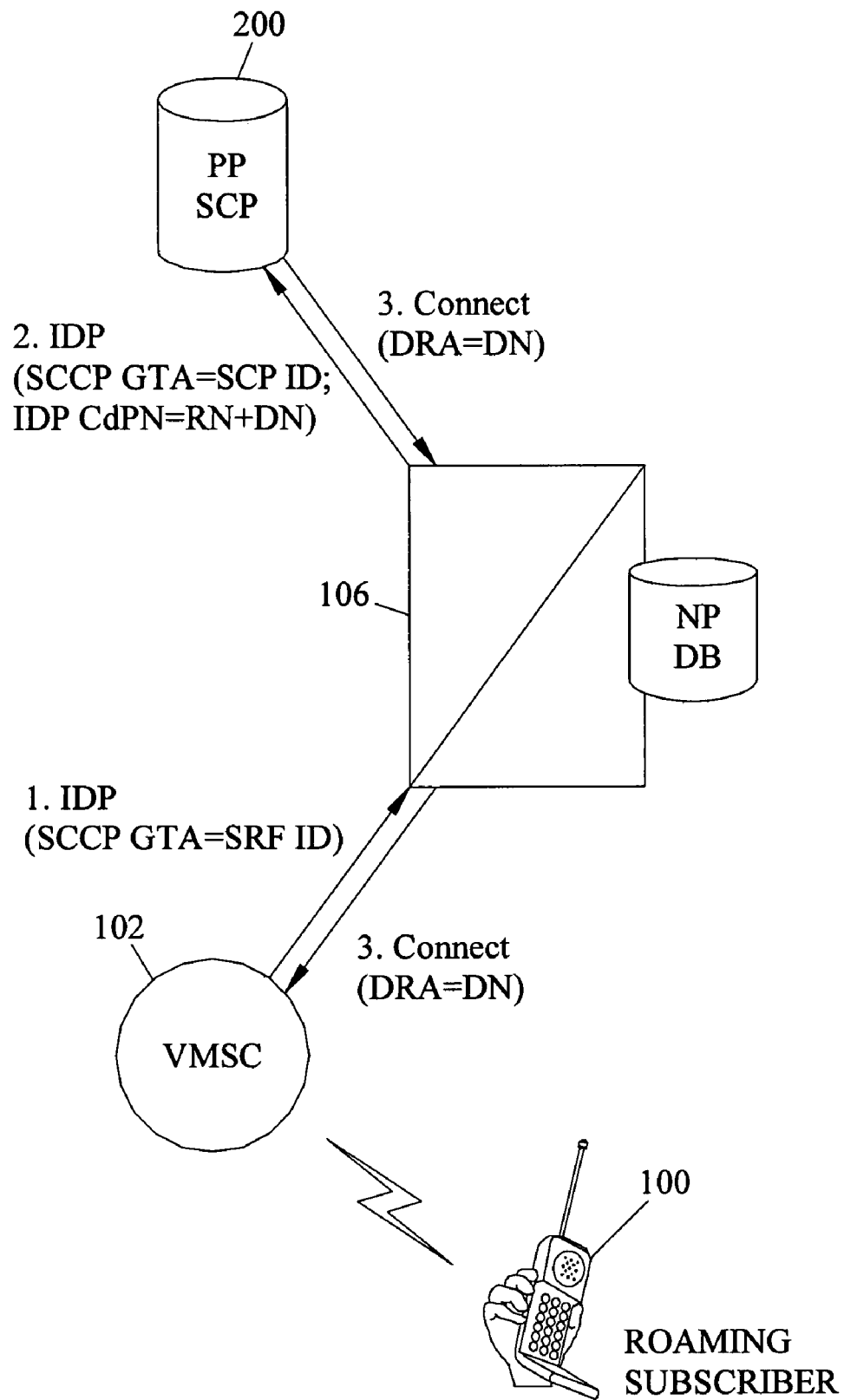
FIG. 2 is a network diagram illustrating an exemplary message flow for processing a prepaid query message for a mobile originated call to a ported subscriber according to an embodiment of the subject matter described herein.

FIG. 2 is a network diagram illustrating exemplary steps that may be performed when a prepaid roaming subscriber who has previously registered with VMSC 102 originates a call. Referring to FIG. 2, when subscriber 100 originates a call, VMSC 102 detects that the call is from a prepaid subscriber and sends an initial detection point (IDP) message to STP 106. An IDP message may be a customized applications for mobile networks enhanced logic (CAMEL) application part (CAP) or an intelligent network application protocol (INAP) message used by an originating switch to query a database to obtain call processing instructions. Normally, the IDP message would be sent to the prepaid subscriber service control point (SCP) based on the prepaid subscriber SCP address received from the HLR during registration. However, as described above with respect to FIG. 1, HLR 104 inserts the address of STP 106 as the prepaid subscriber database address in the registration response message. As a result, VMSC 102 uses the address of STP 106 as the prepaid subscriber database address.

When STP 106 receives the IDP message, STP 106 performs a number portability lookup and determines that the called party number has been ported. STP 106 modifies the IDP message to include the RN corresponding to the called party number. STP 106 performs a prepaid database location lookup using originating party address in the IDP portion of the message to identify the prepaid subscriber SCP to which the IDP message should be sent. STP 106 then modifies the signaling connection and control part (SCCP) portion of the message to include the global title address of the prepaid subscriber SCP, global title translates the message, and routes the message to prepaid subscriber SCP associated with the calling party number. STP 106 may also insert the RN obtained in the NP lookup and the called party directory number (DN) in the IDP called party number field of the IDP message.

When prepaid subscriber SCP 200 receives the IDP message, prepaid subscriber SCP 200 uses the ported-to RN to determine whether the called subscriber is a subscriber of the same network as the calling subscriber. That is, prepaid subscriber SCP 200 may identify the network of the calling party using the calling party DN. Prepaid subscriber SCP 200 may identify the network of the called party using the RN in the IDP portion of the message, rather than the called party DN. If the called subscriber is of the same network as the calling subscriber, prepaid subscriber SCP 200 may determine that an in-network billing rate is to be applied. If the called subscriber is not of the same network as the calling subscriber, prepaid subscriber SCP 200 may determine that an out-of-network billing rate is to be applied. The billing rate to be applied for in-network and out-of-network calls may be determined by comparing the called party RN and the calling party number to each other and/or to ranges of numbers stored in the database maintained by SCP 200.

Once the appropriate billing rate is determined, prepaid subscriber SCP 200 formulates a connect message indicating the appropriate billing information and forwards the connect message to VMSC 102. In one exemplary implementation, the connect message may include the ported-to RN and an indication that a number portability lookup has been performed so that VMSC 102 can route the call to the called subscriber. In an alternate implementation, the connect message may not include the RN, and VMSC 102 may be required to formulate an NP query to obtain the RN and route the call to the called subscriber.

Thus, using the steps illustrated in FIG. 2, prepaid calls can be properly billed, even when the called party number has been ported out of the service provider's network. The solution illustrated in FIG. 2 eliminates the need for the STP to intercept query messages for prepaid subscribers. In addition, the need for the HLR to store prepaid subscriber to prepaid database mappings is also eliminated.

Figure 3:
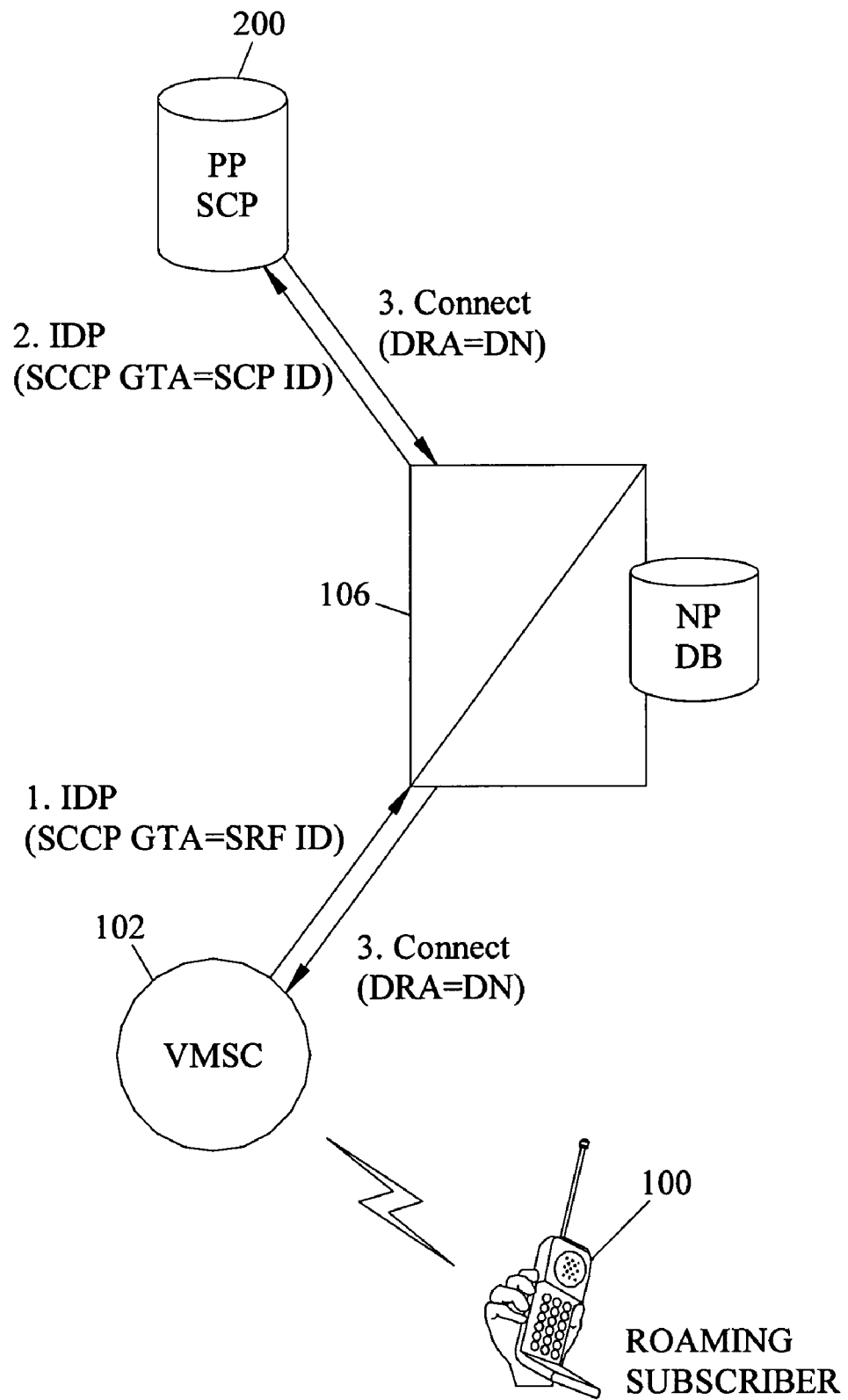
FIG. 3 is a network diagram illustrating an exemplary message flow for processing a prepaid query message for a mobile originated call to a non-ported subscriber according to an embodiment of the subject matter described herein.

FIG. 3 illustrates exemplary messages that may be exchanged for a mobile originated prepaid call to a non-ported subscriber. For the mobile originated non-ported subscriber case illustrated in FIG. 3, VMSC 102 sends the IDP message to STP 106, as described in the ported subscriber case. In this instance, a number portability lookup is performed and it is determined that the called party number has not been ported. Accordingly, STP 106 does not modify the IDP portion of the message signaling unit (MSU). STP 106 performs the prepaid database lookup using the calling party number to determine the prepaid SCP to which the message should be sent. STP 106 modifies the SCCP portion of the MSU to include the prepaid subscriber SCP ID. STP 106 then performs global title translation (GTT), modifies the message transfer part (MTP) portion of the MSU to include the point code and subsystem number of the prepaid subscriber SCP, and routes the MSU to the prepaid SCP associated with the calling party number. Prepaid subscriber SCP 200 responds to the IDP message with the correct billing information for the call. Thus, even in the non-ported case, prepaid calls are correctly billed. In addition, the need for the HLR to store mappings between calling party numbers and prepaid subscriber databases is reduced.

Figure 4:
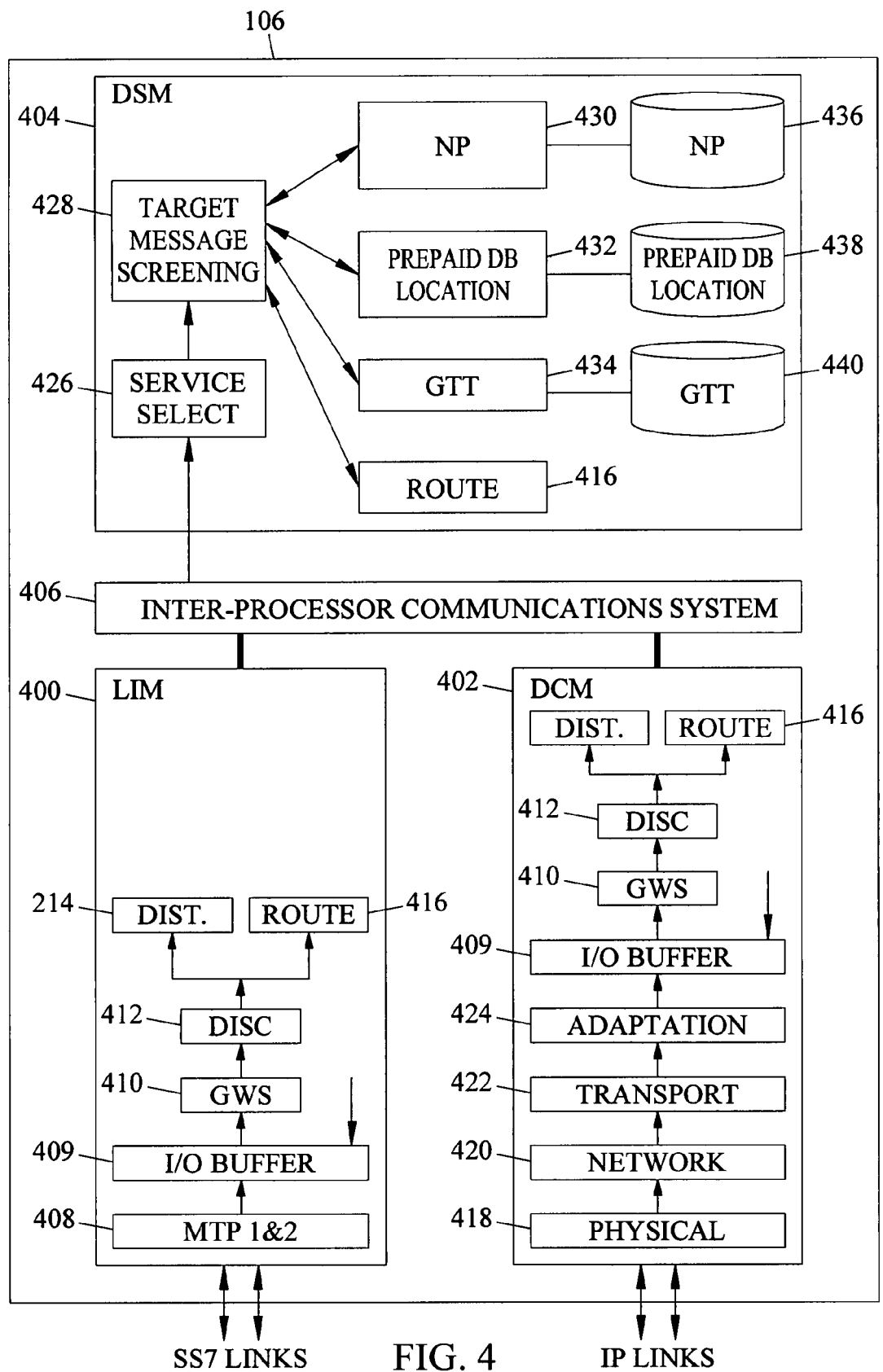
FIG. 4 is a block diagram illustrating a signal transfer point capable of processing messages relating to calls originating from prepaid mobile subscribers according to an embodiment of the subject matter described herein.
Figure 5:
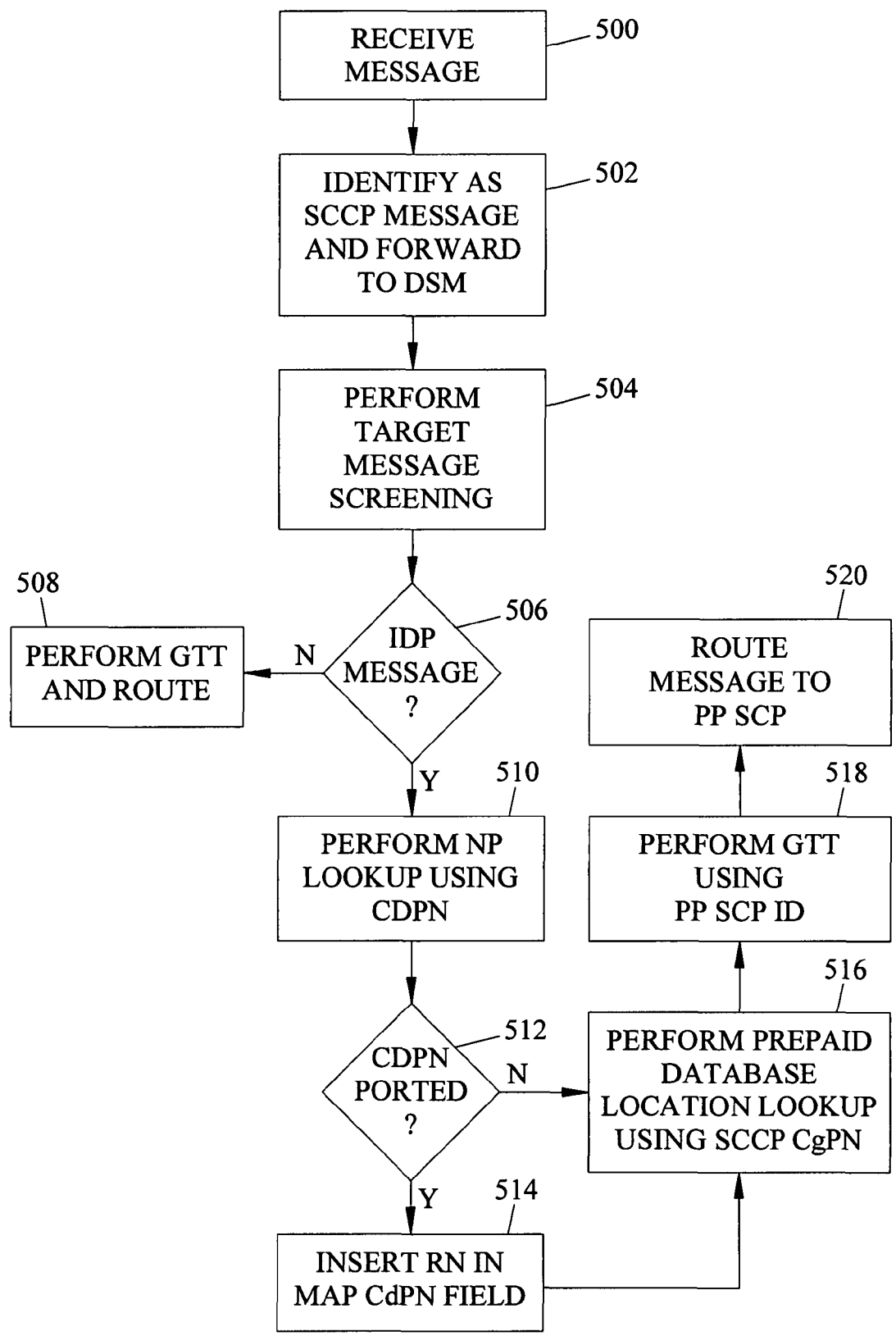
FIG. 5 is a flow chart illustrating exemplary steps that may be performed by the STP of FIG. 4 in processing messages relating to calls originating from prepaid mobile subscribers according to an embodiment of the subject matter described herein.

FIG. 4 is a block diagram illustrating an exemplary internal architecture for STP 106. Referring to FIG. 5, STP 106 includes a link interface module (LIM) 400, a data communications module (DCM) 402, and a database services module (DSM) 404. Each module 400, 402, and 404 may include a printed circuit board, an application processor for performing application level processing of signaling messages, and a communications processor for controlling interprocessor communications via interprocessor communications system 406. Interprocessor communications system 406 may be any suitable mechanism for providing message communication between processing modules 400, 402, and 404. For example, communications system 406 may be a bus, an Ethernet LAN, or any other suitable mechanism for providing communications between processors.

LIM 400 includes various functions for sending and receiving signaling messages over SS7 signaling links. In the illustrated example, LIM 400 includes a message transfer part (MTP) level 1 and 2 function 408, an I/O buffer 409, a gateway screening (GWS) function 410, a discrimination function 412, a distribution function 414, and a routing function 416. MTP level 1 and 2 function 408 performs MTP level 1 and 2 functions, such as error detection, error correction, and sequencing of signaling messages. I/O buffer 409 stores inbound signaling messages before the messages are processed by higher layers. I/O buffer 409 also stores outbound signaling messages waiting to be transmitted over a signaling link by MTP level 1 and 2 function 408. Gateway screening function 410 screens inbound signaling messages based on destination point code and, optionally, based on originating point code to determine whether the messages should be allowed into the network. Discrimination function 412 analyzes the destination point code in each received signaling message to determine whether the signaling message should be processed by an internal processing module within STP 106 or whether the message should be routed over an outbound signaling link. Discrimination function 412 forwards messages that are to be internally processed to distribution function 414. Discrimination function 412 forwards messages that are to be routed over an outbound signaling link to routing function 416.

Distribution function 414 distributes messages that are identified as requiring internal processing to the appropriate internal processing module. For example, distribution function 414 may forward SCCP messages to database services module 404 for SCCP processing. Routing function 416 routes signaling messages that are addressed to point codes other than the point code of STP 106. For example, routing function 416 may forward messages to another link interface module (not shown in FIG. 4) or to data communications module 402 for transmission over an outbound signaling link.

DCM 402 includes various functions for sending and receiving SS7 messages over IP signaling links. In FIG. 4, these functions include a physical layer function 418, a network layer function 420, a transport layer function 422, an adaptation layer function 414, and signaling system 7 (SS7) MTP functions 409-416 as described with regard to LIM 400. Physical layer function 418 may be any suitable physical layer function for sending and receiving frames that encapsulate network layer packets. In one exemplary implementation, physical layer function 418 may be implemented using an Ethernet transceiver. Network layer function 420 may be implemented using Internet protocol, such as IPv4 or IPv6. Transport layer function 422 may be implemented using any suitable transport layer protocol. Examples of transport protocols suitable for use with embodiments of the subject matter described herein include user datagram protocol (UDP), transmission control protocol (TCP), and stream control transmission protocol (SCTP). Adaptation layer function 424 may be implemented using any suitable adaptation layer for sending SS7 messages over IP. Examples of adaptation layers suitable for use with the subject matter described herein include M3UA, M2PA, SUA, and TALI, as described in the correspondingly named IETF Internet drafts and RFCs. The remaining functions of DCM 402 are the same as those described with regard to LIM 400. Hence, a description thereof will not be repeated herein.

DSM 404 includes various functions and databases for processing signaling messages. In the illustrated example, DSM 404 includes a service selection function 426, a target message screening function 428, a number portability function 430, a prepaid database location function 432, a GTT function 434, and a routing function 416. Database services module also includes a number portability database 436, a prepaid database location database 438, and a GTT database 440. Service selection function 426 receives messages from interface processors and determines the type of service required for each message. For example, service selection function 426 may determine whether further screening of messages is required or whether the messages are simply to be global title translated and routed. For CAP or INAP messages, service selection function 426 may forward the messages to target message screening function 428. Target message screening function 428 screens CAP or INAP messages received by DSM 404 to identify targeted message types. According to the subject matter described herein, target message screening function 428 may identify IDP messages as a targeted message type requiring further processing. For IDP messages, targeted message screening function 428 may communicate with number portability function 430, prepaid database location function 432, and GTT function 434 to perform number portability, prepaid database location, and global title translation lookups.

Number portability function 430 performs local number portability lookups in number portability database 436 based on called party numbers. For example, number portability database 436 may include entries corresponding to mobile station integrated services digital network (MSISDN) numbers and corresponding routing numbers. If a routing number is associated with an entry, the entry may represent a ported number. Accordingly, number portability function 430 may extract the routing number from the entry and insert the routing number in an outbound IDP message, as described above.

Prepaid database location function 432 performs prepaid database location lookups based on calling party numbers in prepaid database location database 438. Global title translation function 434 performs GTT lookups based on SCCP called party addresses in GTT database 440 and inserts new destination point codes and subsystem numbers in the messages. Routing function 416 routes messages to outbound signaling links.

FIG. 5 is a flow chart illustrating exemplary steps that may be performed by STP 106 illustrated in FIG. 4 in processing IDP messages according to an embodiment of the subject matter described herein. Referring to FIG. 5, in step 500, STP 106 receives a signaling message. For purposes of illustration, it is assumed that the signaling message is an SS7 message received by LIM 400. The signaling message is assumed to be addressed to the point code of STP 106. As illustrated in FIG. 1, HLR 104 may provide the point code of STP 106 as the prepaid platform ID.

The signaling message is assumed to pass gateway screening, and, in step 502, the signaling message is identified as an SCCP message and is forwarded by distribution function 414 to database services module 404. Upon reaching database services module 404, service selection function 426 forwards the message to targeted message screening function 428 where screening is to performed to identify targeted message types, such as IDP messages (step 504).

In step 506, targeted message screening function 428 determines whether the signaling message is an IDP message. If the message is not an IDP message, control proceeds to step 508 where global title translation is performed, and the message is routed to its intended destination. In step 506, if the message is identified as an IDP message, control proceeds to step 510 where a number portability lookup is performed using the called party directory number (DN) stored in the IDP portion of the message. In step 512, if the called party number has been ported, control proceeds to step 514 where a number portability lookup is performed and the routing number is inserted in the IDP called party number field.

After the number portability lookup, control proceeds to step 516 where a prepaid database location lookup is performed using the calling party number extracted from the SCCP calling party number field of the message. The result of the prepaid database location lookup is a service control point ID corresponding to the prepaid subscriber SCP. This ID is inserted in the SCCP global title address field. In step 518, global title translation is performed using the prepaid SCP ID. The global title translation results in a point code and subsystem number corresponding to the prepaid SCP ID. In step 520, the message is routed to the prepaid subscriber SCP. Routing the message to the prepaid subscriber SCP may include forwarding the message from DSM 404 to either LIM 400 or DCM 402 where the message is sent over the appropriate outbound signaling link. If the message is sent over an IP link, DCM 402 may encapsulate the IDP message in an IP datagram for outbound transport.

Once the prepaid subscriber SCP receives the IDP message, the prepaid subscriber SCP will determine whether the called party and the calling party are of the same network. As described above, if the called party has been ported, the prepaid subscriber SCP will use the routing number to determine whether the calling party and the called party are of the same network. If the called party number has not been ported, the prepaid subscriber SCP will use the original called party number to determine whether the call is an in-network call. Because a number portability lookup is performed in advance of sending the IDP message to the prepaid subscriber SCP, correct billing rate information can be obtained for calls, even when the called subscriber has been ported.

Although the example architecture illustrated in FIG. 3 shows the number portability, prepaid location, and GTT databases as being internal to STP 106, the subject matter described herein is not limited to such an implementation. In an alternate implementation, any one or more of the databases can be located external to STP 106. In an implementation in which one or more of the database are external to STP 106, DSM 404 may formulate the appropriate query to the database, forward the query to the database, and receive the response. The remaining processing would be the same as that described with respect to FIG. 5.

It should also be noted that in the architecture illustrated in FIG. 3, the STP and HLR functions are located on separate nodes. However, the subject matter described herein is not limited to such an implementation. In alternate implementation, the STP and HLR functions may be combined within a single node. In such an implementation, the operation the subject matter described herein would be the same as that described above, except that the messages flowing between the STP and the HLR would flow internally between the STP and HLR functions.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A prepaid subscriber and/or number portability routing node comprising:
   (a) at least one interface module for sending and receiving signaling messages over a network, the interface module receiving a query message relating to a call originated by a prepaid mobile subscriber;
   (b) a number portability function for performing a number portability lookup that includes extracting a called party number from the query message, obtaining a routing number from a number portability database corresponding to the called party number, and inserting the routing number in the query message;
   (c) a prepaid subscriber database location function for obtaining a prepaid subscriber database address corresponding to a calling party number in the query message;
   (d) a routing function for routing the query message that has been modified to include the routing number to a prepaid subscriber database corresponding to the prepaid subscriber database address; and
   (e) wherein the at least one interface module, the number portability function, the prepaid subscriber database location function, and the routing function are located at the prepaid subscriber number portability routing node.

2. The prepaid subscriber number portability routing node of claim 1 wherein the interface module comprises an SS7 link interface module for sending and receiving SS7 signaling messages.

3. The prepaid subscriber number portability routing node of claim 1 wherein the interface module comprises an Internet protocol (IP) link interface module for sending and receiving IP telephony signaling messages.

4. The prepaid subscriber number portability routing node of claim 1 comprising a number portability database accessible by the number portability function for obtaining the routing number.

5. The prepaid subscriber number portability routing node of claim 1 comprising a prepaid subscriber database location database accessible by the prepaid subscriber database location function for obtaining the prepaid subscriber SCP address.

6. The prepaid subscriber number portability routing node of claim 1 comprising a global title translation function and a global title translation database for translating the prepaid subscriber database address into a point code, wherein the routing function is adapted to route the query message to the point code.

7. The prepaid subscriber number portability routing node of claim 1 comprising a targeted message screening function for identifying an initial DP (IDP) message as the query message.

* * * * *